(12) United States Patent
Akihisa et al.

(10) Patent No.: US 7,627,417 B2
(45) Date of Patent: Dec. 1, 2009

(54) VARIABLE COMPRESSION RATIO INTERNAL COMBUSTION ENGINE

(75) Inventors: Daisuke Akihisa, Susono (JP); Eiichi Kamiyama, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 357 days.

(21) Appl. No.: 11/658,644

(22) PCT Filed: Mar. 28, 2006

(86) PCT No.: PCT/JP2006/307011

§ 371 (c)(1),
(2), (4) Date: Jan. 26, 2007

(87) PCT Pub. No.: WO2006/112256

PCT Pub. Date: Oct. 26, 2006

(65) Prior Publication Data

US 2008/0190406 A1 Aug. 14, 2008

(30) Foreign Application Priority Data

Apr. 14, 2005 (JP) ............................ 2005-117328

(51) Int. Cl.
*G06F 19/00* (2006.01)
*F02B 75/04* (2006.01)
*F02B 33/44* (2006.01)

(52) U.S. Cl. .................. 701/110; 123/78 C; 123/78 R; 701/103; 60/605.1

(58) Field of Classification Search ............... 123/48 R, 123/48 C, 78 R, 78 C, 79 E, 78 F, 90.15–90.18, 123/316, 347, 348; 701/101–103, 110, 111
See application file for complete search history.

(56) References Cited

U.S. PATENT DOCUMENTS

| | | | | |
|---|---|---|---|---|
| 5,819,702 | A | * | 10/1998 | Mendler ..................... 123/311 |
| 7,165,517 | B2 | * | 1/2007 | Sugiyama et al. ......... 123/48 R |
| 7,213,545 | B2 | * | 5/2007 | Goransson et al. ......... 123/78 F |
| 2001/0047778 | A1 | | 12/2001 | Aoyama et al. |

FOREIGN PATENT DOCUMENTS

| | | |
|---|---|---|
| EP | 1 160 430 A2 | 12/2001 |
| JP | A-62-078440 | 4/1987 |
| JP | U-63-150048 | 10/1988 |
| JP | A-02-163429 | 6/1990 |
| JP | A-05-149142 | 6/1993 |
| JP | A-07-026981 | 1/1995 |
| JP | A-2001-342859 | 12/2001 |
| JP | A-2002-070601 | 3/2002 |
| JP | A-2003-206771 | 7/2003 |
| JP | A-2004-156464 | 6/2004 |
| JP | A-2004-183510 | 7/2004 |
| JP | 2005069129 A * | 3/2005 ............... 123/78 R |
| JP | 2006046193 A * | 2/2006 ............... 123/78 R |

* cited by examiner

*Primary Examiner*—Willis R Wolfe, Jr.
(74) *Attorney, Agent, or Firm*—Oliff & Berridge, PLC

(57) ABSTRACT

The invention provides a technology that enables to control response delay of the supercharger in a variable compression ratio internal combustion engine under acceleration. When the variable compression ratio internal combustion engine is under acceleration, the compression ratio of the internal combustion engine is set to a compression ratio lower than a basic compression ratio that is so determined in accordance with the running condition of the internal combustion engine to realize a predetermined heat efficiency while suppressing knocking, thereby raising the exhaust gas pressure and shortening the response time of the supercharger.

9 Claims, 8 Drawing Sheets

VARIABLE COMPRESSION RATIO INTERNAL COMBUSTION ENGINE

TECHNICAL FIELD

The present invention relates to a variable compression ratio internal combustion engine in which the compression ratio can be varied.

BACKGROUND ARTS

In recent years, technologies for making it possible to vary the compression ratio of an internal combustion engine with a view to improve performance of the internal combustion engine in terms of gas mileage and power etc. have been proposed. In an already proposed technology as such, a cylinder block and a crank case are linked in such a way as to allow their movement relative to each other, and a cam shaft is provided in their link portion to displace the cylinder block and the crankcase toward and away from each other by turning the cam shaft, as disclosed in Japanese Patent Application Laid-Open Nos. 7-26981 and 2003-206771.

In the aforementioned variable compression ratio internal combustion engine, the compression ratio of the internal combustion engine is changed in accordance with the running condition of it so as to prevent knocking in the internal combustion engine and ensure sufficient thermal efficiencies.

On the other hand, as disclosed for example in Japanese Patent Application Laid-Open No. 5-149142, internal combustion engines equipped with an exhaust turbine driven supercharger (or a turbocharger, which will be simply referred to as a "supercharger" hereinafter) that is driven by the exhaust gas provided in an exhaust passage of the internal combustion engine have been conventionally known. The supercharger is a apparatus in which a turbine is turned utilizing energy of the exhaust gas discharged from the cylinder thereby compressing air by means of a compressor attached to the rotary shaft same as the turbine shaft and supplying the compressed air into the cylinder.

In internal combustion engines in which the above-described technologies are used in combination, if response delay of the supercharger is large, when a request for acceleration is made to the internal combustion engine by, for example, pressing the accelerator pedal, the time lag between pressing of the accelerator pedal and rising of the supercharging pressure becomes long, which sometimes makes it difficult to achieve satisfactory acceleration performance. In connection with this, various technologies have been proposed: Japanese Patent Application Laid-Open Nos. 2002-70601 and 2-163429 teach to retard compression ratio reduction control in accordance with delay in the supercharging pressure upon acceleration to prevent a decrease in the torque in the early stage of acceleration; Japanese Patent Application Laid-Open No. 2001-342859 teaches to reduce the compression ratio with an actual increase in the supercharging pressure thereby preventing knocking form occurring; Japanese Utility Model Application Laid-Open No. 63-150048 teaches to set the compression ratio in such a way that the higher the load is the lower the compression ratio is and to set a supercharging pressure as a control target in accordance with the compression ratio thereby preventing knocking from occurring during acceleration; Japanese Patent Application Laid-Open No. 2004-156464 teaches to delay compression ratio reduction control in accordance with delay in rising of the temperature at the exit of an intercooler during acceleration to prevent a decrease in the torque in the early stage of acceleration during which knocking is hardly to occur.

DISCLOSURE OF INVENTION

The present invention has been made in view of the above-described problem of prior arts and has as an object to provide a technology for making it possible to reduce the response delay of a supercharger during acceleration in a variable compression ratio internal combustion engine.

The most important feature of the present invention that is intended to achieve the above object is that while a variable compression ratio internal combustion engine is under acceleration, the compression ratio of the internal combustion engine is set to a compression ratio lower than a basic compression ratio that is determined in accordance with the running condition of the internal combustion engine so as to achieve a specific heat efficiency while suppressing knocking, thereby increasing the exhaust gas pressure and shortening the response time of the supercharger.

More specifically, a variable compression ratio internal combustion engine comprises:

a compression ratio changing mechanism that can change the compression ratio of the internal combustion engine;

a supercharger driven by the exhaust gas from said internal combustion engine for supercharging intake air to said internal combustion engine; and basic compression ratio derivation section for deriving a basic compression ratio with which a specific heat efficiency can be achieved with knocking in said internal combustion engine being suppressed, in accordance with a running condition of said internal combustion engine, wherein while said internal combustion engine is running, the compression ratio of the internal combustion engine is set to said basic compression ratio by said compression ratio changing mechanism, and when said internal combustion engine enters a specific acceleration state, the compression ratio of the internal combustion engine is changed by said compression ratio changing mechanism to a specific compression ratio suitable for acceleration that is lower than said basic compression ratio.

In the variable compression ratio internal combustion engine (which will be simply referred to as the internal combustion engine hereinafter), the compression ratio is generally controlled, in accordance with the running condition of the internal combustion engine, to be set to the highest possible compression ratio (which will be referred to as the "basic compression ratio" hereinafter) that does not involves knocking in the internal combustion engine. By this control, the highest possible heat efficiency is ensured while preventing knocking from occurring. When a request for acceleration is made to the internal combustion engine through depression of the accelerator pedal while the above-described compression ratio control is performed, it may be impossible to increase the supercharging pressure sufficiently quickly due to the aforementioned delay in the response of the supercharger, and satisfactory acceleration performance cannot be achieved in some cases.

On the other hand, it is known that when the compression ratio of an internal combustion engine is made lower, the heat efficiency in the internal combustion engine generally decreases, which leads to an increase in the exhaust gas pressure if the intake air flow rate is constant.

In the present invention, taking advantage of this, while the internal combustion engine is under acceleration, the compression ratio is set to a compression ratio suitable for acceleration that is lower than the aforementioned basic compression ratio. With this feature, it is possible to make the pressure of the exhaust gas higher than in the case where the compression ratio is set to the basic compression ratio, and the start-up time of the supercharger can be shortened accordingly. Therefore, it is possible to control the response delay of the supercharger upon acceleration, and it is possible to achieve excellent acceleration performance.

The aforementioned specific acceleration state refers to the state in which the required acceleration is higher than or equal to a threshold acceleration above which the influence of the response delay of the supercharger becomes noticeable when the compression ratio of the internal combustion engine is set to the aforementioned basic compression ratio. The threshold acceleration may be determined in advance by experiments. Hereinafter, expressions like "an internal combustion engine is under acceleration" or "a request for acceleration is made to an internal combustion engine" shall mean that the engine is in this specific acceleration state.

In the present invention, the aforementioned compression ratio suitable for acceleration may be the lowest possible compression ratio that can be set by the aforementioned compression ratio changing mechanism. By adopting this feature, it is possible to make the exhaust gas pressure as high as possible while the internal combustion engine is under acceleration, and it is possible to shorten the start-up time of the supercharger more reliably.

Furthermore, in the present invention, the aforementioned compression ratio suitable for acceleration may be determined in the range in which an engine torque associated with acceleration that results when an increase in the engine torque due to an increase in the exhaust gas pressure of the internal combustion engine caused by the changing of the compression ratio from the basic compression ratio to the compression ratio suitable for acceleration and a decrease in the engine torque due to a decrease in the heat efficiency of the internal combustion engine caused by the changing of the compression ratio from the basic compression ratio to said compression ratio suitable for acceleration are added to a basic engine torque that is defined as the engine torque in the state in which the compression ratio is the basic compression ratio is larger than or equal to said basic engine torque.

Here, the basic engine torque is the engine torque that is achieved when the compression ratio of the internal combustion engine is set to the aforementioned basic compression ratio. The engine torque associated with acceleration is the engine torque that results when an effect of shortening of the rising time of the supercharging pressure caused by changing of the compression ratio from the basic compression ratio to the relatively low compression ratio suitable for acceleration and an influence of a decrease in the heat efficiency itself are exerted in combination on the basic engine torque.

When the compression ratio of an internal combustion engine is made lower, an increase in the exhaust gas pressure results, as described before. Making use of this effect, it is possible to increase the rotation speed of the supercharger and to increase the torque of the internal combustion engine. On the other hand, when the compression ratio of the internal combustion engine is made lower, the heat efficiency itself of the internal combustion engine becomes lower, which causes a decrease in the engine torque. Accordingly, when the compression ratio of the internal combustion engine is made lower, whether the torque of the internal combustion engine during acceleration can be increased or not depends on which of the effect of the increase in the exhaust gas pressure and the influence of the decrease in the heat efficiency itself is dominant.

In view of the above, in the present invention, the aforementioned compression ratio suitable for acceleration is determined in the range in which the engine torque associated with acceleration becomes larger than or equal to the aforementioned basic engine torque. Here, the engine torque associated with acceleration is the engine torque that results when an increase in the engine torque due to an increase in the exhaust gas pressure of the internal combustion engine caused by the changing of the compression ratio from the basic compression ratio to the compression ratio suitable for acceleration and a decrease in the engine torque due to a decrease in the heat efficiency of the internal combustion engine caused by the changing of the compression ratio from the basic compression ratio to said compression ratio suitable for acceleration are added to the basic engine torque that is defined as the engine torque in the state in which the compression ratio is the basic compression ratio.

With the above feature, while the internal combustion engine is under acceleration, it is possible to increase the torque of the internal combustion engine by setting the compression ratio to the aforementioned compression ratio suitable for acceleration and to achieve excellent acceleration performance more reliably.

Furthermore, in the present invention, the aforementioned compression ratio suitable for acceleration may be a compression ratio with which the engine torque associated with acceleration that results when an increase in the engine torque due to an increase in the exhaust gas pressure of the internal combustion engine caused by the changing of the compression ratio from the basic compression ratio to the compression ratio suitable for acceleration and a decrease in the engine torque due to a decrease in the heat efficiency of the internal combustion engine caused by the changing of the compression ratio from the basic compression ratio to the compression ratio suitable for acceleration are added to the basic engine torque that is defined as the engine torque in the state in which the compression ratio is the basic compression ratio becomes maximum.

As per the above, the compression ratio suitable for acceleration that is to be set while the internal combustion engine is under acceleration is set to a compression ratio that maximize the engine torque associated with acceleration that results from both an effect of shortening of the rising time of the supercharging pressure caused by changing of the compression ratio from the basic compression ratio to the above-described compression ratio and an influence of a decrease in the heat efficiency itself. With this feature, it is possible to make the engine torque as high as possible while the internal combustion engine is under acceleration, and to achieve the best possible acceleration performance.

Furthermore, in the present invention, after acceleration of the internal combustion engine has been started, the compression ratio of the internal combustion engine may be set by the compression ratio changing mechanism to the aforementioned compression ratio suitable for acceleration during a period in which the engine torque associated with acceleration that results when an increase in the engine torque due to an increase in the exhaust gas pressure of the internal combustion engine caused by the changing of the compression ratio from the basic compression ratio to the compression ratio suitable for acceleration and a decrease in the engine torque due to a decrease in the heat efficiency of the internal combustion engine caused by the changing of the compression ratio from the basic compression ratio to the compression ratio suitable for acceleration are added to the basic engine torque that is defined as the engine torque in the state in which the compression ratio is the basic compression ratio is larger than or equal to the basic engine torque.

As per the above, in the present invention, when the internal combustion engine enters the acceleration state, the compression ratio is changed from the basic compression ratio to the compression ratio suitable for acceleration. In this case, whether the torque of the internal combustion engine can be increased upon acceleration or not depends on which of the effect of shortening of the rising time of the supercharging pressure and the influence of the decrease in the heat efficiency is dominant. In view of this, in the present invention, the compression ratio may be set by the compression ratio changing mechanism to the aforementioned compression ratio suitable for acceleration during a period in which the aforementioned engine torque associated with acceleration becomes larger than or equal to the aforementioned basic engine torque.

With this feature, even in the case where the aforementioned compression ratio suitable for acceleration is designed to be a predetermined constant compression ratio or a compression ratio that is simply lower than the basic compression ratio by a constant value, the compression ratio of the internal combustion engine can be set by the compression ratio changing mechanism to such a compression ratio suitable for acceleration only during a period in which the engine torque associated with acceleration is larger than or equal to the basic engine torque. As a result, it is possible to increase the torque of the internal combustion engine under acceleration and to achieve excellent acceleration performance more reliably.

In the present invention, the compression ratio of the internal combustion engine may be set by said compression ratio changing mechanism to said compression ratio suitable for acceleration during a period after acceleration of said internal combustion engine has been started until supercharging pressure of said supercharger becomes larger than or equal to a specific pressure. Here, the specific pressure is a threshold supercharging pressure above which the acceleration required to the internal combustion engine is achieved, namely above which it can be considered that the delay of the supercharger is substantially zero. The specific pressure may be determined in advance by experiments.

With this feature, while the internal combustion engine is under acceleration, it is possible to set the compression ratio of the internal combustion engine to the compression ratio suitable for acceleration only during the period in which there actually is a delay in the response of the supercharger. Therefore, it is possible to prevent the rotation speed of the supercharger from increasing more than necessary.

The means for achieving the object according to the present invention described in the forgoing may be applied in any possible combination.

BEST MODE FOR CARRYING OUT THE INVENTION

In the following, the best mode for carrying out the present invention will be described by way of illustration with reference to the accompanying drawings.

First Embodiment

The internal combustion engine 1 that will be described in the following is a variable compression ratio internal combustion engine, in which the compression ratio is changed by displacing a cylinder block 3 having cylinders 2, along the direction of the center axes of the cylinders 2, relative to a crankcase 4 to which pistons are linked.

Figure 1:
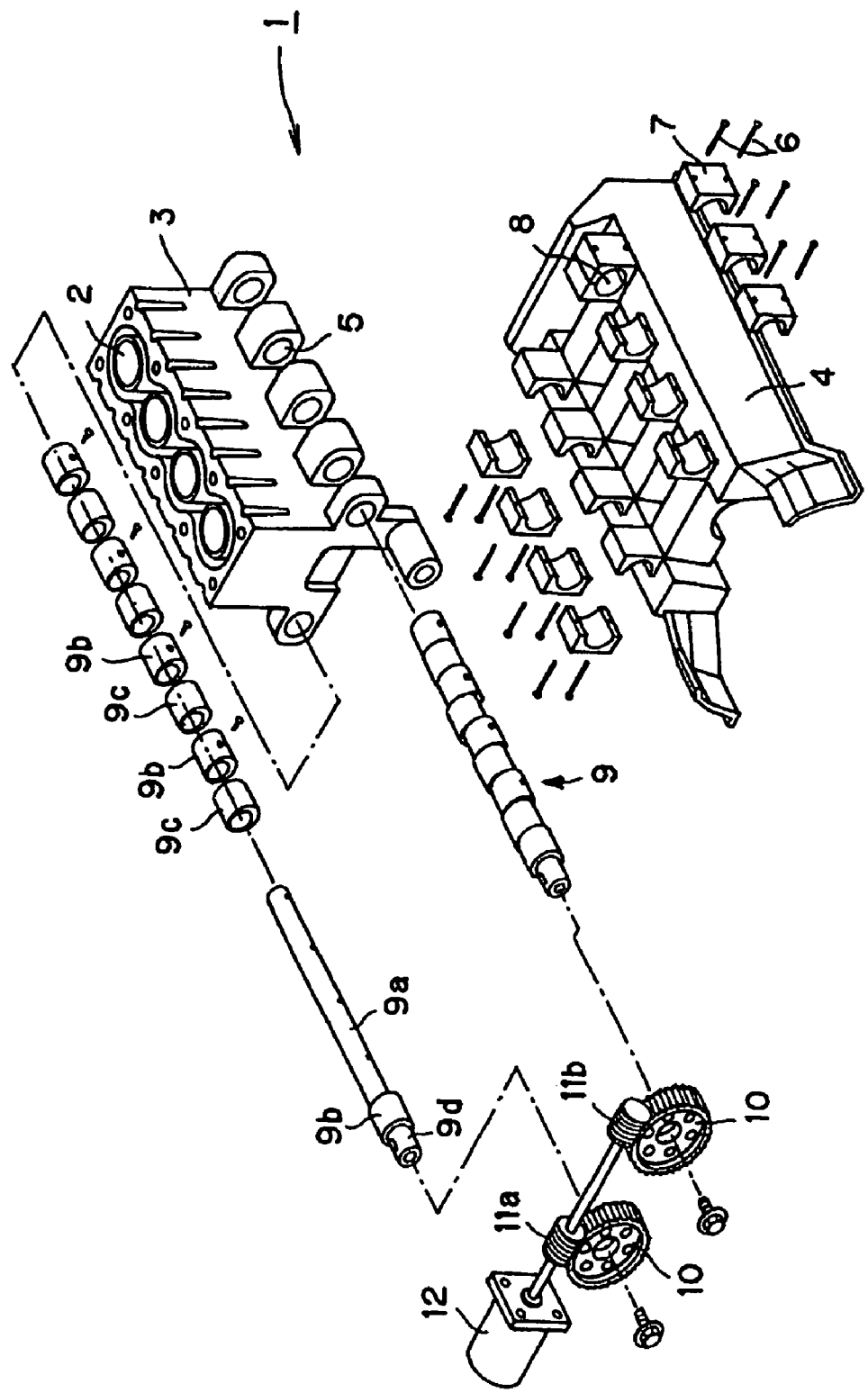
FIG. 1 is an exploded perspective view showing the basic structure of the internal combustion engine according to an embodiment of the present invention.

First, the structure of the variable compression ratio internal combustion engine according to this embodiment will be described with reference to FIG. 1. As shown in FIG. 1, the cylinder block 3 has a plurality of projecting portions formed on both the lower sides thereof. Each projecting portion has a bearing receiving bore 5 formed therein. The bearing receiving bore 5 is cylindrical in shape and extending perpendicularly to the axial direction of the cylinders 2 and parallel to the direction of arrangement of the multiple cylinders 2. The bearing receiving bores 5 on one side are arranged coaxially, and a pair of axes of the bearing receiving bores 5 on both sides of the cylinder block 3 are parallel to each other.

The crankcase 4 has standing wall portions to be placed between the above-mentioned projecting portions that have the bearing receiving bores 5. On the outwardly facing (with respect to the crankcase 4) surface of each standing wall portion is a semi-cylindrical recess. Caps 7 that are to be attached to the respective standing wall portions by bolts 6 are also prepared. The cap 7 also has a semi-cylindrical recess. When the cap 7 is attached to each standing wall portion, a cam receiving bore 8 having a cylindrical shape is formed. The shape of the cam receiving bore 8 is the same as the above-mentioned bearing receiving bore 5.

Similarly to the bearing receiving bores 5, the cam receiving bores 8 are formed in such a way as to extend perpendicularly to the axial direction of the cylinders 2 and parallel to the direction of arrangement of the multiple cylinders 2 when the cylinder block 3 is attached to the crankcase 4. These multiple cam receiving bores 8 are also formed on both sides of the cylinder block 3, and all the cam receiving bores 8 on one side are arranged coaxially. A pair of axes of the cam receiving bores 8 on both sides of the cylinder block 3 are parallel to each other. The distance between the bearing receiving bores 5 on one side and those on the other side is equal to the distance between the cam receiving bores 8 on one side and those on the other side.

A cam shafts 9 are respectively inserted in the two rows of the bearing receiving bores 5 and the cam receiving bores 8 that are alternately arranged. As shown in FIG. 1, the cam shaft 9 includes a shaft portion 9a, cam portions 9b, each having a perfect circular cam profile, that are fixed on the shaft portion 9a eccentrically with respect to the center axis of the shaft portion 9a and movable bearing portions 9c, each having the same outer profile as the cam portions 9b, that are rotatably attached on the shaft portion 9a. The cam portions 9b and the movable bearing portions 9c are arranged alternately. The two cam shafts 9 are mirror images to each other. On one end of the cam shaft 9 is formed a mount portion 9d for a gear 10 (which will be described later). The center axis of the shaft portion 9a and the center of the mount portion 9d do not coincide with each other, while the center of the cam portions 9b and the center of the mount portion 9d coincide with each other.

The movable bearing portions 9c are also eccentric with respect to the shaft portion 9a, and their degree of eccentricity is the same as that of the cam portions 9b. In each of the cam shafts 9, the cam portions 9b are eccentric in the same direction. Since the outer profile of the movable bearing portions 9c is perfect circular with the diameter same as that of the cam portions 9b, it is possible to align the outer surfaces of the plurality of cam portions 9b and the outer surfaces of the plurality of movable bearing portions 9c by turning the movable bearing portions 9c.

A gear 10 is attached on one end of each cam shaft 9. The pair of gears 10 attached at ends of the pair of cam shafts 9 are in engagement with respective worm gears 11a and 11b. The worm gears 11a and 11b are mounted on a single output shaft of a single motor 12. The worm gears 11a and 11b have helical groove with the helix directions opposite to each other. Accordingly, as the motor 12 turns, the two cam shafts 9 are rotated by the gears 10 in the directions opposite to each other. The motor 12 is fixedly mounted on the cylinder block 3 and moves integrally with it. The mechanism shown in FIG. 1 constitutes the compression ratio changing mechanism in this embodiment.

Figure 2:
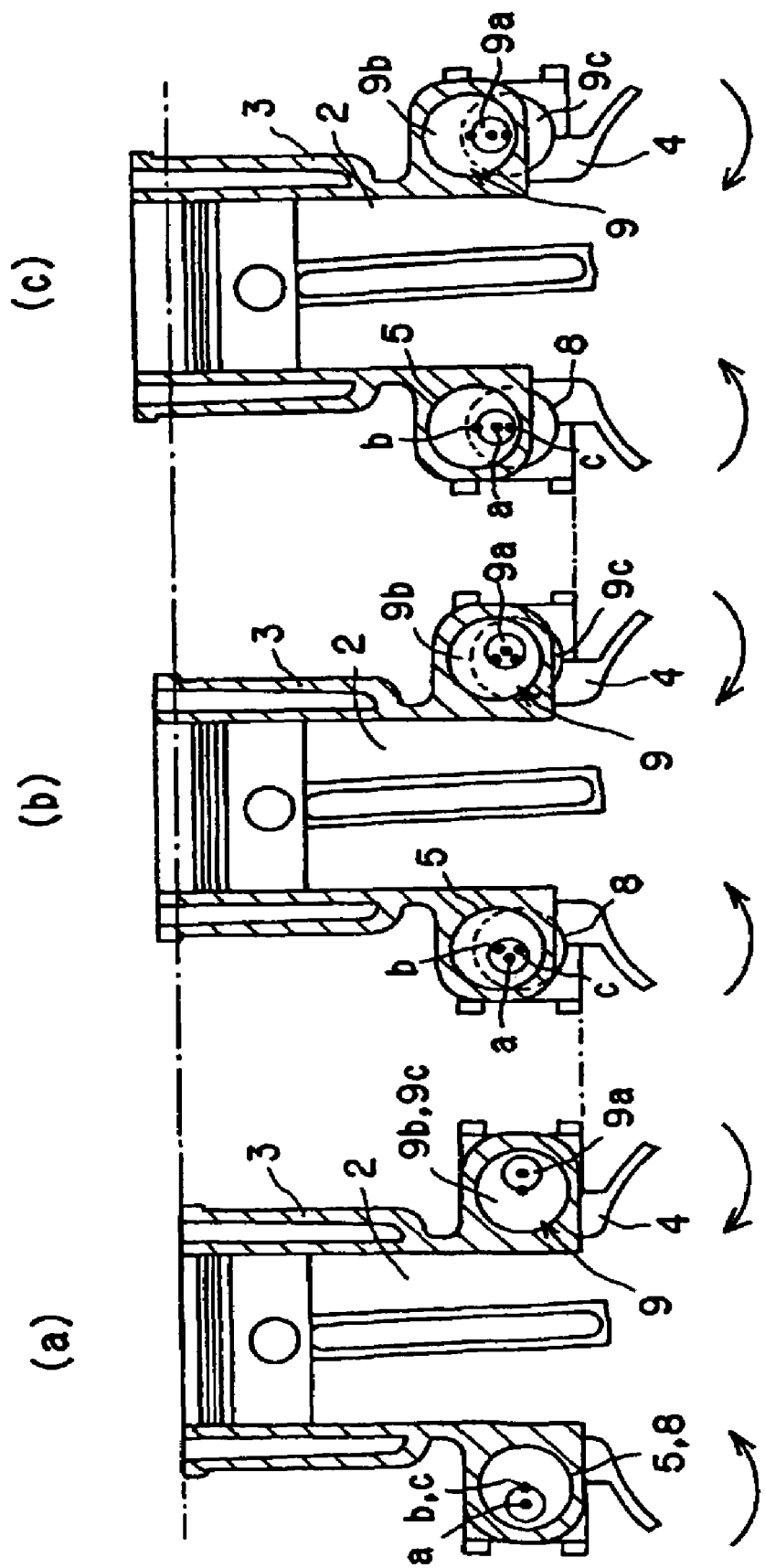
FIG. 2 is a cross sectional view showing a process of movement of a cylinder block relative to a crankcase in the internal combustion engine according to the embodiment of the present invention.

In the following, a method of controlling the compression ratio in the internal combustion engine 1 having the above-described structure will be described in detail. FIGS. 2(a) to 2(c) are cross sectional views that show relationship among the cylinder block 3, the crankcase 4 and the cam shafts 9 provided therebetween. In FIGS. 2(a) to 2(c), the center axis of the shaft portion 9a is designated by "a", the center of the cam portions 9b is designated by "b", and the center of the movable bearing portions 9c is designated by "c". FIG. 2(a) shows a state in which the outer circumferences of all the cam portions 9b and the movable bearing portions 9c are aligned as seen from the direction along the shaft portion 9a. In this state, the two shaft portions 9a are located at outer positions in the bearing receiving bores 5 and the cam receiving bores 8.

When the shaft portions 9a are turned, by driving the motor 12, in the direction indicated by arrows from the state shown in FIG. 2(a), the state shown in FIG. 2(b) is realized. Since the direction of eccentricity of the cam portions 9b and that of the movable bearing portions 9c with respect to the shaft portion 9a become different from each other through this turning process, the cylinder block 3 can be displaced relative to the crankcase 4 toward the top dead center side. The displacement amount becomes maximum when the cam shaft 9 is turned to the state shown in FIG. 2(c). In that state, the displacement amount is twice the amount of eccentricity of the cam portions 9b and the movable bearing portions 9c. The cam portions 9b and the movable bearing portions 9c rotate respectively in the interior of the cam receiving bores 8 and the bearing receiving bores 5 to allow displacement of the shaft portion 9a in the interior of the cam receiving bores 8 and the bearing receiving bores 5.

By using the above-described mechanism, it is possible to move the cylinder block 3 relative to the crankcase 4 along the axial direction of the cylinders 2, thereby making it possible to variably control the compression ratio.

Figure 3:
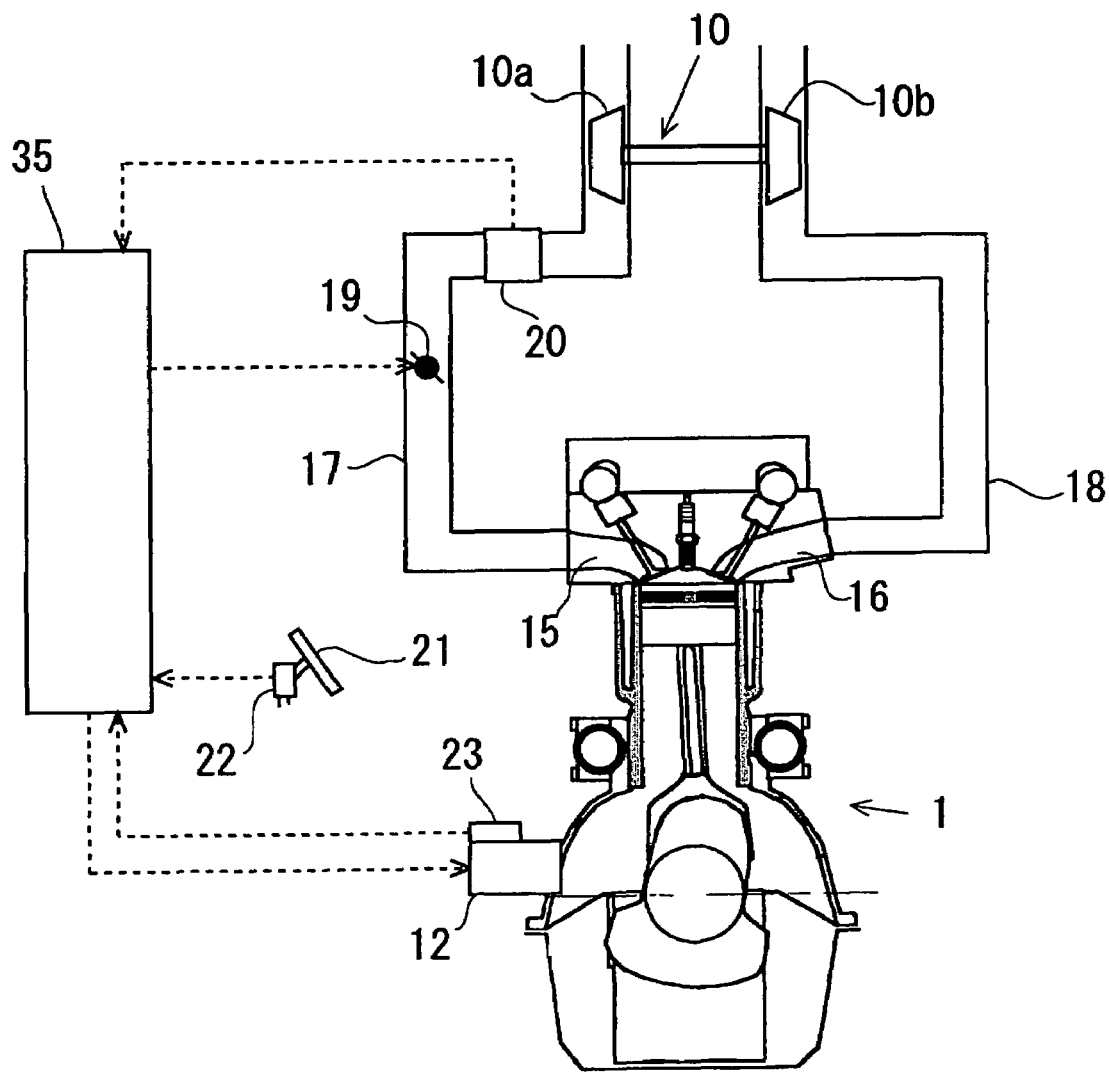
FIG. 3 is a cross sectional view showing the detailed structure of the internal combustion engine according to the first embodiment of the present invention.

FIG. 3 schematically shows the structure of the internal combustion engine 1 according to this embodiment and its intake and exhaust systems. In FIG. 3, an intake pipe 17 is connected to an intake port 15 of the internal combustion engine 1. A compressor 10a of a supercharger (or a turbocharger) 10 is mounted in the intake pipe 17. In the intake pipe 17 downstream of the compressor 10a, there is provided an airflow meter 20 for detecting the intake air quantity, and in the downstream of the airflow meter 20, there is provided an intake throttle valve 19 for regulating the quantity of the intake air introduced into the internal combustion engine 1 through the intake pipe 17.

On the other hand, an exhaust pipe 18 is connected to an exhaust port 16 of the internal combustion engine 1. The turbine 10b of the supercharger 10 is mounted in the exhaust pipe 18. The exhaust pipe 18 is connected with a muffler (not shown) at its downstream.

To the internal combustion engine 1 having the above described structure is annexed an electronic control unit (ECU) 35 for controlling the internal combustion engine 1. The ECU 35 is a unit that controls the running condition of the internal combustion engine 1 in accordance with requirements for running of the internal combustion engine 1 and driver's demands. The ECU 35 is connected, via electric wiring, with the airflow meter 20, an accelerator position sensor 22 for detecting the depression stroke of the accelerator pedal 21 and an encoder 23 attached to a motor 12 for detecting the compression ratio of the internal combustion engine 1 by counting the rotation angle of the motor 12 etc. The ECU 35 is also connected, via electric wiring, with a fuel injection valve (not shown), an ignition plug (not shown), the intake throttle valve 19 and the motor 12. Fuel supply and fuel ignition in each cylinder, the quantity of intake air introduced into the internal combustion engine 1 and the compression ratio of the internal combustion engine 1 are controlled based on commands from the ECU 35.

The ECU 35 has a CPU, a ROM and a RAM etc. The ROM stores programs for performing various control of the internal combustion engine 1 and maps containing data. An example of the programs stored in the ROM of the ECU 35 is a routine for changing the compression ratio upon acceleration that will be described later.

In the internal combustion engine 1 as described above, the compression ratio is changed in accordance with the running condition of the internal combustion engine 1. For example, when the internal combustion engine 1 is in a high load running condition, knocking is likely to occur. In such cases, the compression ratio of the internal combustion engine 1 is made as high as possible in the range in which knocking does not occur. By doing so, both prevention of knocking and ensuring of satisfactory heat efficiency in the internal combustion engine 1 are achieved. The compression ratio that is determined in this way in accordance with the running condition of the internal combustion engine 1 during running will be hereinafter referred to as the basic compression ratio. Since this basic compression ratio is determined by the ECU 35, the ECU 35 constitutes the basic compression ratio derivation section in this embodiment.

Next, a control to be performed when a request for acceleration is made to the internal combustion engine 1 according to this embodiment will be described in the following. When a request for acceleration is made to the internal combustion engine 1, the pressure and the amount of the exhaust gas from the internal combustion engine increase, which in turn causes an increase in the rotation speed of the turbine 10b of the supercharger 10. Then, the rotation speed of the compressor 10a also increases, and the intake air to the internal combustion engine 1 is supercharged accordingly. Consequently, the torque of the internal combustion engine 1 can be raised at an early stage, and acceleration performance that meets the request for acceleration is realized.

However, if the response of the supercharger 10 is slow in the control process for acceleration, it takes a significant time from when the pressure and the amount of the exhaust gas from the internal combustion engine 1 increase until the supercharging pressure of the intake air to the internal combustion engine 1 rises sufficiently. This sometimes affects the acceleration performance of the internal combustion engine 1.

On the other hand, if the compression ratio of the internal combustion engine 1 is made lower, the heat efficiency of the internal combustion engine 1 decreases, as described before. It is known that in such cases the energy that has not been used for producing the engine torque is given to the exhaust gas, whereby the pressure of the exhaust gas from the internal combustion engine 1 rises. This embodiment makes use of this phenomenon to reduce the response delay of the supercharger 10.

Figure 4:
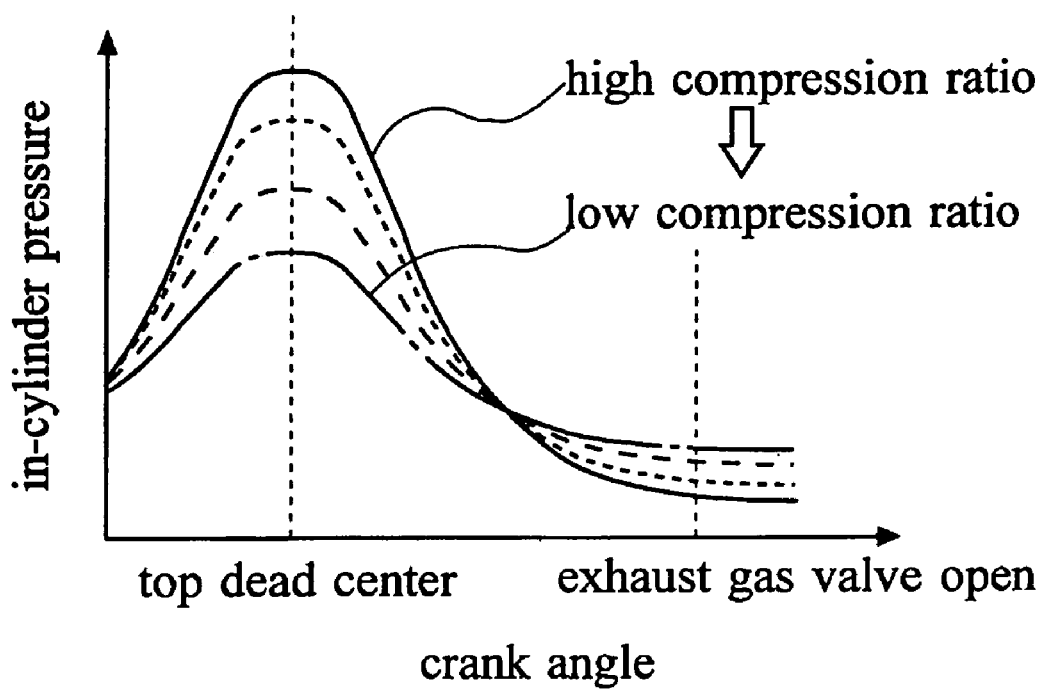
FIG. 4 is a graph for illustrating the relationship between the compression ratio and the exhaust gas pressure in the internal combustion engine.

FIG. 4 is a graph illustrating how the compression ratio influences the in-cylinder pressure of the internal combustion engine 1. In FIG. 4, the horizontal axis represents the crank angle, and the vertical axis represents the in-cylinder pressure. As will be seen from FIG. 4, as the compression ratio of the internal combustion engine 1 is made lower, the in-cylinder pressure near the top dead center decreases. On the other hand, the in-cylinder pressure at the time of opening the exhaust valve increases. This means that the lower the compression ratio is, the higher the pressure of the exhaust gas from the internal combustion engine 1 at the time of opening the exhaust valve becomes.

Figure 5:
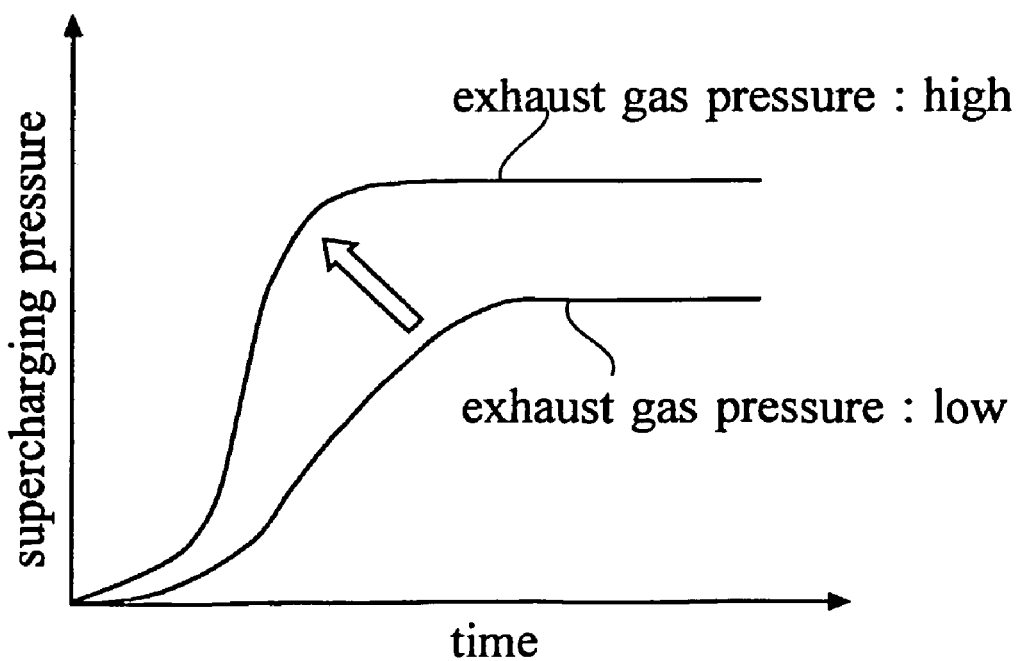
FIG. 5 is a graph for illustrating the rising characteristic of the supercharging pressure in relation to the exhaust gas pressure.

On the other hand, it is known that an increase in the pressure of the exhaust gas from the internal combustion engine 1 leads to an improvement in the starting characteristic of the supercharger 10. FIG. 5 is a graph illustrating how the exhaust gas pressure influences the starting characteristic of the supercharger. In FIG. 5, the horizontal axis represents time, and the vertical axis represents the supercharged pressure of the intake air to the internal combustion engine 1. As will be seen from FIG. 5, an increase in the exhaust gas pressure leads to an improvement in the starting characteristic of the pressure of the intake air supercharged by the supercharger 10.

In this embodiment, when a request for acceleration is made to the internal combustion engine 1, the compression ratio of the internal combustion engine 1 is changed to a compression ratio suitable for acceleration that is lower than the basic compression ratio . . . . Thus, the pressure of the exhaust gas from the internal combustion engine 1 is increased thereby preventing response delay of the supercharger 10.

Figure 6:
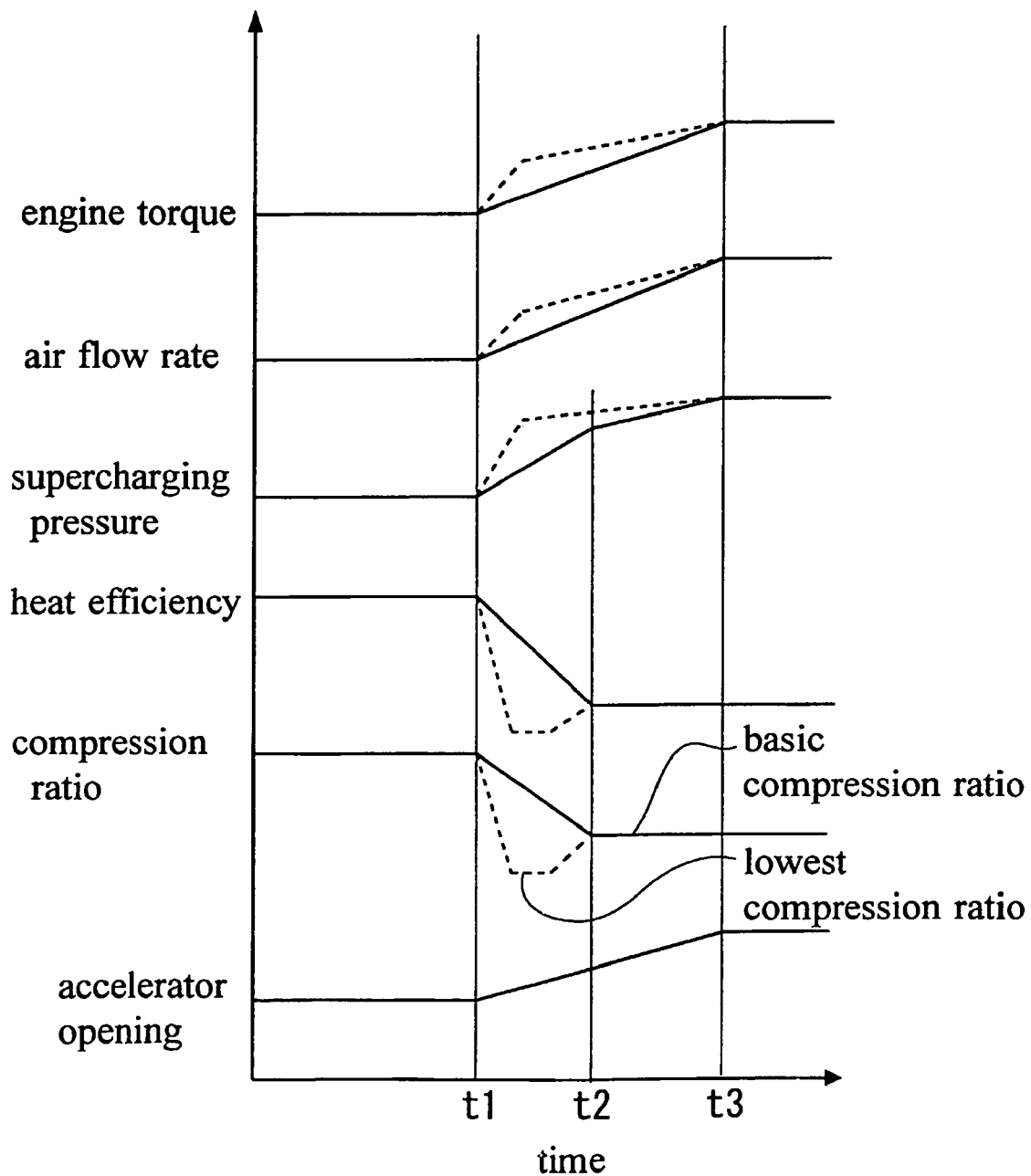
FIG. 6 is a graph showing changes in parameters in the control according to the first embodiment of the present invention.

FIG. 6 is a graph showing changes in the degree of opening of the accelerator, compression ratio, heat efficiency, supercharging pressure, intake air flow rate, and engine torque on the occasion that a request for acceleration is made to the internal combustion engine 1 in this embodiment. In this graph, it is assumed that the request for acceleration is made by depression of the accelerator pedal 21 through the time period from time t1 to time t3. The solid lines in the graph represent changes in the parameters in a case where the embodiment is not applied, and the broken lines represent those in a case where the embodiment is applied.

First, the case in which the embodiment is not applied will be described. In this case, depression of the accelerator pedal 21 at time t1 causes a change in the running condition of the internal combustion engine 1. In view of this, the compression ratio is reduced to the basic compression ratio corresponding to the running condition at time t2 that is estimated from the depression stroke of the accelerator pedal 21. In this way, in the case where the embodiment is not applied, the output of the accelerator position sensor 22 is retrieved at certain time intervals. Then, the running condition after the elapse of time (t2-t1) is estimated based on the output, and the compression ratio is changed to the basic compression ratio corresponding to the estimated running condition. If the running condition of the internal combustion engine 1 after the predetermined time is different from the estimation, the compression ratio is changed again.

The aforementioned decrease in the compression ratio involves a decrease in the heat efficiency of the internal combustion engine 1. In the time period from time t1 to time t2, in addition to an increase in the exhaust gas pressure caused by the decrease in the heat efficiency, as described above, the exhaust gas pressure is also increased by very depression of the accelerator pedal 21.

Consequently, in the time period from time t1 to time t2, the rotation speed of the supercharger 10 increases steeply, and accordingly the supercharging pressure also rises steeply. When the change in the compression ratio stops at time t2, the rising of the exhaust gas pressure caused by the decrease in the heat efficiency stops, and the rising of the supercharging pressure becomes moderate. From then until time t3 at which request for acceleration made by depression of the accelerator pedal 21 ceases, the supercharging pressure continues to rise gently.

During the time period from time t1 to time t2, the flow rate of the intake air introduced into the internal combustion engine 1 increases with the aforementioned increase in the supercharging pressure, and the torque of the internal combustion engine also increases accordingly.

Next, the case where the embodiment is applied will be discussed. In this case, when the accelerator pedal 21 is depressed at time t1, the compression ratio of the internal combustion engine 1 is once reduced to the lowest possible compression ratio. Then, the compression ratio is increased to reach, at time t2, the basic compression ratio corresponding to the estimated running condition. According to this control method, the pressure of the exhaust gas from the internal combustion engine 1 can be increased as much as possible during the time period between time t1 to time t2. Therefore, it is possible to increase the supercharging pressure, the air flow rate and the torque of the internal combustion engine 1 at an earlier time as compared to the case where this embodiment is not applied.

As per the above, in this embodiment, when a request for acceleration is made to the internal combustion engine 1, the compression ratio is once decreased to the lowest compression ratio, and thereafter the compression ratio is changed to the basic compression ratio corresponding to the estimated running condition. By this process it is possible to increase the exhaust gas pressure as much as possible and to reduce the response delay of the supercharger 10. In this embodiment, the lowest compression ratio corresponds to the compression ratio suitable for acceleration.

In this embodiment, after the time t1 at which the accelerator pedal 21 is depressed, the compression ratio is once reduced to the lowest compression ratio, and then it is increased to reach the basic compression ratio at a predetermined time t2. Alternatively, after the time t1 at which the accelerator pedal 21 is depressed, the supercharging pressure may be monitored while reducing the compression ratio to the lowest compression ratio, and the compression ratio may be controlled to the basic compression ratio at the time when the supercharging pressure reaches a value needed to achieve the acceleration corresponding to the depression stroke of the accelerator pedal 21. By this control, it is possible to change the compression ratio to the basic compression ratio at the time at which there no longer is delay in response of the supercharger to the depression of the accelerator pedal 21, and more excellent acceleration performance can be achieved. The above-described supercharging pressure required to achieve the acceleration corresponding to the depression stroke of the accelerator pedal 21 corresponds to the specific pressure in this embodiment.

Specifically, a map containing relationship between the output of the accelerator position sensor 22 and the supercharging pressure needed to achieve the acceleration required at that time may be prepared, and the compression ratio may be changed to the basic compression ratio when the supercharging pressure as monitored becomes equal to or higher than the supercharging pressure corresponding to the output of the accelerator position sensor 22 read out from the map.

Second Embodiment

In the following, a second embodiment will be described. In the second embodiment, when a request for acceleration is made to the internal combustion engine 1, the optimum compression ratio with which the engine torque becomes maximum is estimated and the compression ratio is changed to the optimum compression ratio while the accelerator pedal is depressed.

Figure 7:
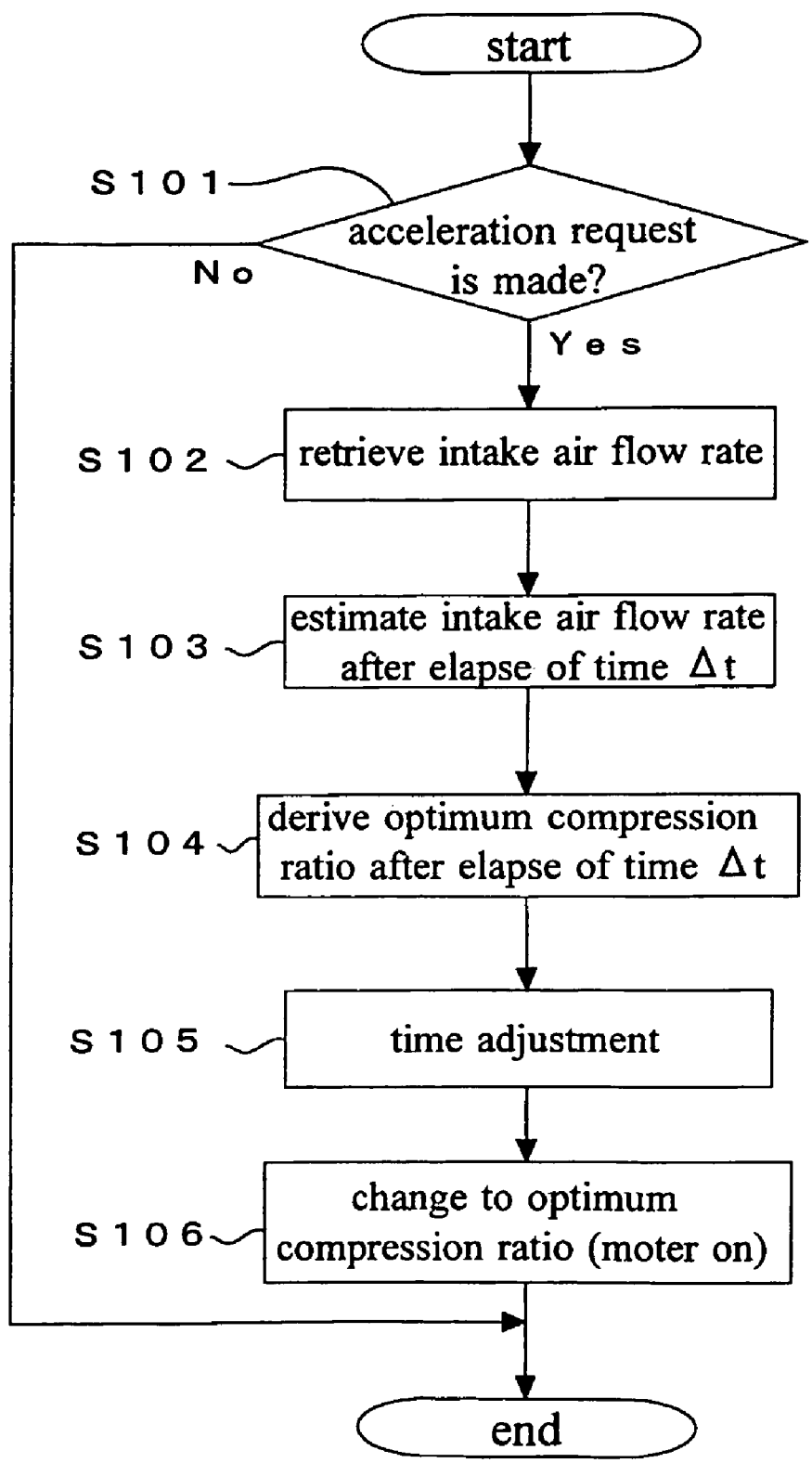
FIG. 7 is a flow chart of a routine for changing the compression ratio suitable for acceleration according to a second embodiment of the present invention.

FIG. 7 is a flow chart of a compression ratio changing routine upon acceleration in this embodiment. This routine is a program stored in the ROM of the ECU 35, and executed at predetermined intervals after the internal combustion engine 1 is activated.

When this routine is executed, firstly in step S101, a determination is made as to whether a request for acceleration is made to the internal combustion engine 1 or not. Specifically, the depression stroke of the accelerator pedal 21 is detected by the accelerator position sensor 22, and a determination is made as to whether the detected value is larger than or equal to a specific depression stroke or not. Here, the specific depression stroke is a threshold vale of the depression stroke of the accelerator pedal 21 above which if the ordinary compression ratio control for setting the compression ratio to the basic compression ratio corresponding to the running condition is performed, response delay of the supercharger 10 is considered to affect the acceleration performance.

If it is determined that a request for acceleration is not made, it is considered that there is no disadvantage in performing the control for changing the compression ratio to the basic compression ratio, and this routine is terminated. On the other hand, if it is determined that a request for acceleration is made, the process proceeds to step S102.

In step S102, the current intake air flow rate is obtained. Specifically, the output of the airflow meter 20 is read into the ECU 35. After completion of step S102, the process proceeds to step S103.

In step S103, the intake air flow at the time after the elapse of time $\Delta t$ at which the next changing of the compression ratio will be performed is estimated. In this process, the estimation may be effected by adding the difference between the intake air flow rate obtained in the last execution of this routine and the intake air flow rate obtained in the current execution of this routine to the intake air flow rate obtained in this routine. After completion of step S103, the process proceeds to step S104.

In step S104, based on the estimated value of the intake air flow rate, the value of the optimum compression ratio with which the maximum engine torque can be expected is derived with reference to an optimum compression ratio map. A description of the optimum compression ratio map will be given later. In this embodiment, the optimum compression ratio corresponds to the compression ratio suitable for acceleration. After completion of step S104, the process proceeds to step S105.

In step S105, adjustment of time $\Delta t$ is effected. Specifically, in this routine the optimum compression ratio after the elapse of time $\Delta t$ is estimated every time, and the compression ratio is changed at time intervals of approximately $\Delta t$. Time $\Delta t$ is set a little longer than the time required for changing the compression ratio by operating the motor 12. In step S105, time adjustment is effected after completion of step S104 until time $\Delta t$ lapses, since the optimum compression ratio after the elapse of time $\Delta t$ is determined in step S104. After completion of step S105, the process proceeds to step S106.

In step S106, the compression ratio is changed to the optimum compression ratio derived in step S104 by supplying electric power to the motor 12. A control for actually counting the output of the encoder 23 and stopping power supply to the motor 12 at the time when the compression ratio of the internal combustion engine 1 becomes the optimum compression ratio is performed by another routine other than this routine simultaneously with this routine. After completion of step S106, this routine is terminated.

Next, the optimum compression ratio map that is used to derive the optimum compression ratio in the above-described routine for changing the compression ratio upon acceleration will be described.

Figure 8:
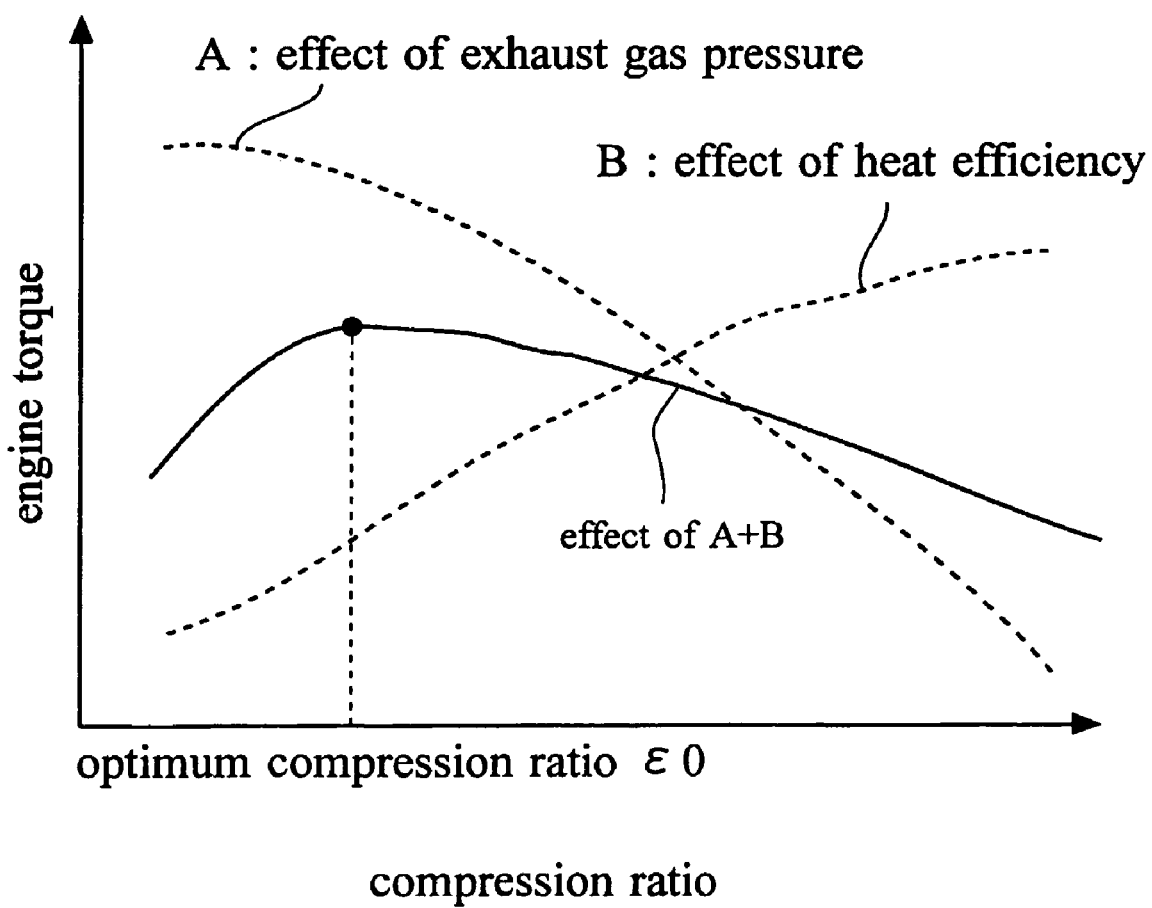
FIG. 8 is a graph for illustrating how an optimum compression ratio is determined in the second embodiment of the present invention.

As discussed before, when the compression ratio of the internal combustion engine 1 is made lower, the exhaust gas pressure becomes higher, and the rotation speed of the supercharger 10 is increased earlier. Consequently, the supercharging pressure rises earlier, and the engine torque increases earlier. In connection with this, it is known that the degree of increase in the engine torque caused by an increase in the exhaust gas pressure is influenced by the intake air flow rate at that time. In view of this, if the value of the intake air flow rate at a later time is known, a curve representing the relationship between the compression ratio and the engine torque that corresponds to that value is determined. FIG. 8 shows such a curve as curve A.

On the other hand, the engine torque also changes with a decrease in the heat efficiency of the internal combustion engine 1 caused by the decrease in the compression ratio. A curve representing such a change is shown in FIG. 8 as curve B. A curve representing the compression ratio and the engine torque as a total is obtained by summing up the influence of curve A and influence of curve B. The solid curve shown in FIG. 8 represents such a curve. The optimum compression ratio $\epsilon 0$ can be derived as the compression ratio corresponding to the point on this curve at which the engine torque becomes the maximum. Incidentally, the curve representing the relationship between the compression ratio and the engine torque as a total was obtained by adding the engine torque according to curve A and the engine torque according to curve B, but the scale along the vertical axis for the resultant curve has been reduced fitly so that the curve is presented at an appropriate position within the graph. The engine torque represented by this curve is the engine torque associated with acceleration.

Curves like the curve shown in FIG. 8 are prepared for various values of the intake air flow rate, and the optimum compression ratio $\epsilon 0$ is determined from each curve. The optimum compression ratio map in this embodiment contains relationship between the intake air flow rate and the optimum compression ratio $\epsilon 0$ thus determined at which the maximum torque can be achieved. In the actual control process, the value of the optimum compression ratio $\epsilon 0$ corresponding to the intake air flow rate after the elapse of time $\Delta t$ estimated in step S103 is read out from the optimum compression ratio map.

As described in the forgoing, in this embodiment, the intake air flow rate after the elapse of time $\Delta t$ is estimated from the current intake air flow rate, thereafter the optimum compression ratio $\epsilon 0$ with which the engine torque can be made maximum at time $\Delta t$ is derived from the intake air flow rate after the elapse of time $\Delta t$ taking into consideration both a change in the heat efficiency and a change in the exhaust gas pressure caused by a change in the compression ratio, and the compression ratio is changed to the optimum compression ratio successively. By this feature, it is possible to achieve improved acceleration performance.

In this embodiment, the optimum compression ratio $\epsilon 0$ that can make the engine torque maximum is obtained when a request for acceleration is made to the internal combustion engine 1, and the compression ratio is changed to the optimum compression ratio successively. However, the compression ratio is not necessarily required to be changed to the optimum compression ratio $\epsilon 0$. When the compression ratio is decreased, the target compression ratio may be determined in such a way as to fall within the range in which the engine torque resulting from an increase in the engine torque caused by an increase in the exhaust gas pressure upon the decrease in the compression ratio and a decrease in the engine torque caused by a decrease in the heat efficiency becomes larger than or equal to the basic engine torque that is achieved at the basic compression ratio. In this case, it is possible to achieve an engine torque that is at least higher than the engine torque achieved when the basic compression ratio is maintained.

Figure 9:
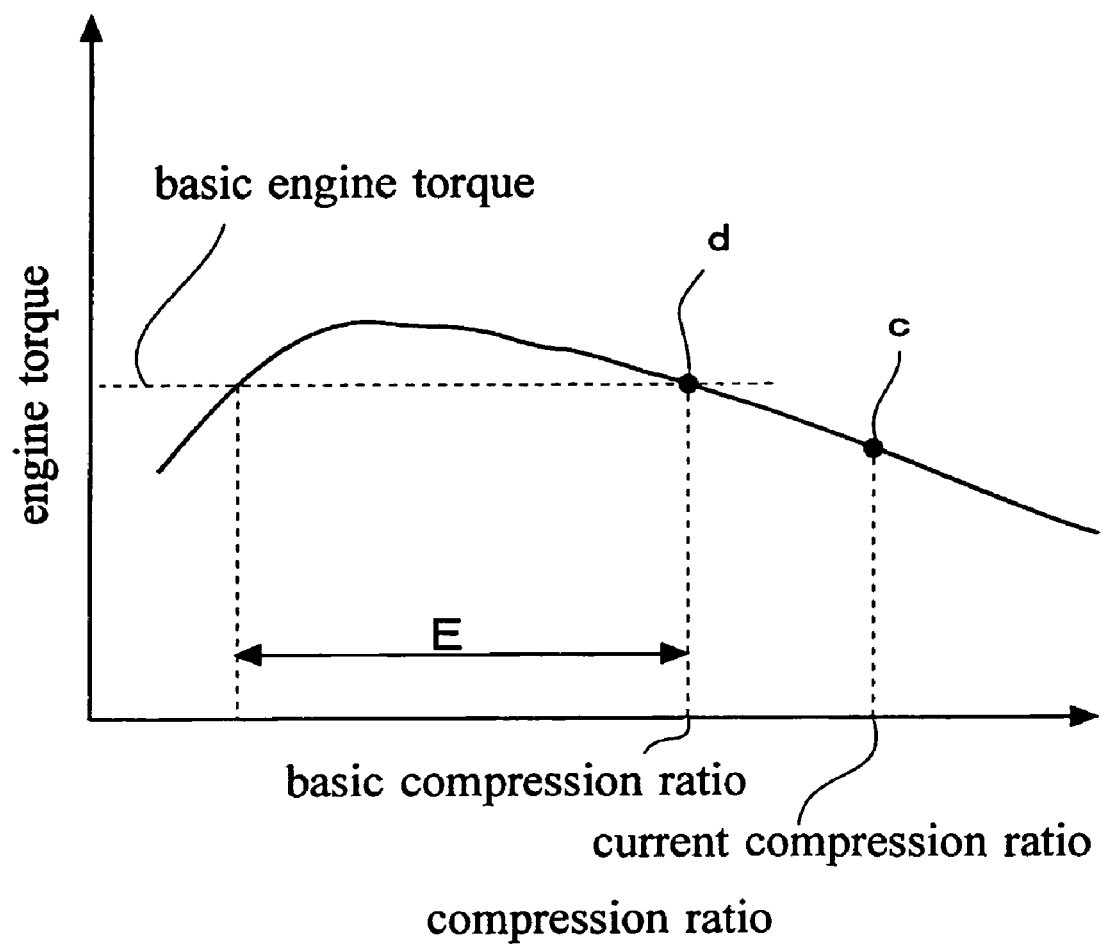
FIG. 9 is a graph for illustrating the compression ratio range in which the engine torque associated with acceleration becomes larger than or equal to the basic torque in the second embodiment of the present invention.

This control method will be described with reference to FIG. 9. In FIG. 9, the horizontal axis represents the compression ratio, and the vertical axis represents the engine torque. The curve in FIG. 9 is the same as the solid curve in FIG. 8. The engine torque represented by this curve is also the engine torque associated with acceleration. Here, it is assumed that point c represents the current compression ratio and the current engine torque, and point d represents the basic compression ratio and the basic engine torque at the time at which a request for acceleration is made to the internal combustion engine 1. In this case, the compression ratio suitable for acceleration should be determined to fall within the range E in which the engine torque associated with acceleration is larger than or equal to the basic engine torque.

Besides the above-described modification of the control of this embodiment, as a simple method, a predetermined constant value may be used as the target compression ratio suitable for acceleration upon request for acceleration made to the internal combustion engine 1, or the target compression ratio may be set to a value that is smaller than the basic compression ratio by a constant value.

In these methods, the compression ratio may be changed to the compression ratio suitable for acceleration rather than the basic compression ratio only if the compression ratio suitable for acceleration resulting from an increase in the engine torque caused by an increase in the exhaust gas pressure upon decrease in the compression ratio and a decrease in the engine torque caused by a decrease in the heat efficiency becomes larger than or equal to the basic engine torque that is achieved at the basic compression ratio. Alternatively, during the acceleration period, the compression ratio may be changed to the compression ratio suitable for acceleration rather than the basic compression ratio only during the period in which, in the case that the compression ratio is decreased to the compression ratio suitable for acceleration, the engine torque associated with acceleration is larger than or equal to the basic engine torque that is achieved at the basic compression ratio.

In this method, the determination as to whether or not the engine torque associated with acceleration becomes larger than or equal to the basic engine torque that is achieved at the basic compression ratio while the compression ratio is decreased to the compression ratio suitable for acceleration may be made using the map prepared based on the solid curves shown in FIGS. 8 and 9. By doing so, it is possible to achieve improved acceleration performance by a simpler control.

INDUSTRIAL APPLICABILITY

According to the present invention, it is possible to control response delay of a supercharger while a variable compression ratio internal combustion engine is under acceleration.

The invention claimed is:

1. A variable compression ratio internal combustion engine comprising:
a compression ratio changing mechanism that can change the compression ratio of the internal combustion engine:
a supercharger driven by exhaust gas from said internal combustion engine for supercharging intake air to said internal combustion engine; and
basic compression ratio derivation section for deriving a basic compression ratio with which a specific heat efficiency can be achieved with knocking in said internal combustion engine being suppressed, in accordance with a running condition of said internal combustion engine,
wherein while said internal combustion engine is running, the compression ratio of the internal combustion engine is set to said basic compression ratio by said compression ratio changing mechanism, and
when said internal combustion engine enters a specific acceleration state, the compression ratio of the internal combustion engine is changed by said compression ratio changing mechanism to a specific compression ratio suitable for acceleration that is lower than said basic compression ratio, wherein said compression ratio suitable for acceleration is determined in the range in which an engine torque associated with acceleration to be larger than or equal to said basic engine torque, said engine torque associated with acceleration results when an increase in the engine torque due to an increase in the exhaust gas pressure of said internal combustion engine caused by the changing of the compression ratio from said basic compression ratio to said compression ratio suitable for acceleration and a decrease in the engine torque due to a decrease in heat efficiency of said internal combustion engine caused by the changing of the compression ratio from said basic compression ratio to said compression ratio suitable for acceleration are added to a basic engine torque that is defined as the engine torque in the state in which the compression ratio is said basic compression ratio.

2. A variable compression ratio internal combustion engine comprising:
- a compression ratio changing mechanism that can change the compression ratio of the internal combustion engine;
- a supercharger driven by exhaust gas from said internal combustion engine for supercharging intake air to said internal combustion engine; and
- basic compression ratio derivation section for deriving a basic compression ratio with which a specific heat efficiency can be achieved with knocking in said internal combustion engine being suppressed, in accordance with a running condition of said internal combustion engine,
- wherein while said internal combustion engine is running, the compression ratio of the internal combustion engine is set to said basic compression ratio by said compression ratio changing mechanism, and
- when said internal combustion engine enters a specific acceleration state, the compression ratio of the internal combustion engine is changed by said compression ratio changing mechanism to a specific compression ratio suitable for acceleration that is lower than said basic compression ratio, wherein said compression ratio suitable for acceleration is a compression ratio with which an engine torque associated with acceleration becomes maximum, said engine torque associated with acceleration results when an increase in the engine torque due to an increase in the exhaust gas pressure of said internal combustion engine caused by the changing of the compression ratio from said basic compression ratio to said compression ratio suitable for acceleration and a decrease in the engine torque due to a decrease in heat efficiency of said internal combustion engine caused by the changing of the compression ratio from said basic compression ratio to said compression ratio suitable for acceleration are added to a basic engine torque that is defined as the engine torque in the state in which the compression ratio is said basic compression ratio.

3. A variable compression ratio internal combustion engine comprising:
- a compression ratio changing mechanism that can change the compression ratio of the internal combustion engine;
- a supercharger driven by exhaust gas from said internal combustion engine for supercharging intake air to said internal combustion engine; and
- basic compression ratio derivation section for deriving a basic compression ratio with which a specific heat efficiency can be achieved with knocking in said internal combustion engine being suppressed, in accordance with a running condition of said internal combustion engine,
- wherein while said internal combustion engine is running, the compression ratio of the internal combustion engine is set to said basic compression ratio by said compression ratio changing mechanism, and
- when said internal combustion engine enters a specific acceleration state, the compression ratio of the internal combustion engine is changed by said compression ratio changing mechanism to a specific compression ratio suitable for acceleration that is lower than said basic compression ratio, wherein after acceleration of said internal combustion engine has been started, the compression ratio of the internal combustion engine is set by said compression ratio changing mechanism to said compression ratio suitable for acceleration during a period in which an engine torque associated with acceleration is larger than or equal to said basic engine torque, said engine torque associated with acceleration results when an increase in the engine torque due to an increase in the exhaust gas pressure of said internal combustion engine caused by the changing of the compression ratio from said basic compression ratio to said compression ratio suitable for acceleration and a decrease in the engine torque due to a decrease in heat efficiency of said internal combustion engine caused by the changing of the compression ratio from said basic compression ratio to said compression ratio suitable for acceleration are added to a basic engine torque that is defined as the engine torque in the state in which the compression ratio is said basic compression ratio.

4. A variable compression ratio internal combustion engine comprising:
- a compression ratio changing mechanism that can change the compression ratio of the internal combustion engine;
- a supercharger driven by exhaust gas from said internal combustion engine for supercharging intake air to said internal combustion engine; and
- basic compression ratio derivation section for deriving a basic compression ratio with which a specific heat efficiency can be achieved with knocking in said internal combustion engine being suppressed, in accordance with a running condition of said internal combustion engine,
- wherein while said internal combustion engine is running, the compression ratio of the internal combustion engine is set to said basic compression ratio by said compression ratio changing mechanism, and
- when said internal combustion engine enters a specific acceleration state, the compression ratio of the internal combustion engine is changed by said compression ratio changing mechanism to a specific compression ratio suitable for acceleration that is lower than said basic compression ratio, wherein the compression ratio of the internal combustion engine is set by said compression ratio changing mechanism to said compression ratio suitable for acceleration during a period after acceleration of said internal combustion engine has been started until supercharging pressure of said supercharger becomes larger than or equal to a specific pressure.

5. A variable compression ratio internal combustion engine according to claim 4, wherein said compression ratio suitable for acceleration is determined in the range in which an engine torque associated with acceleration to be larger than or equal to said basic engine torque, said engine torque associated with acceleration results when an increase in the engine torque due to an increase in the exhaust gas pressure of said internal combustion engine caused by the changing of the compression ratio from said basic compression ratio to said compression ratio suitable for acceleration and a decrease in the engine torque due to a decrease in heat efficiency of said internal combustion engine caused by the changing of the compression ratio from said basic compression ratio to said compression ratio suitable for acceleration are added to a basic engine torque that is defined as the engine torque in the state in which the compression ratio is said basic compression ratio.

6. A variable compression ratio internal combustion engine according to claim 4, wherein said compression ratio suitable for acceleration is a compression ratio with which an engine torque associated with acceleration becomes maximum, said engine torque associated with acceleration results when an increase in the engine torque due to an increase in the exhaust gas pressure of said internal combustion engine caused by the changing of the compression ratio from said basic compression ratio to said compression ratio suitable for acceleration and a decrease in the engine torque due to a decrease in heat efficiency of said internal combustion engine caused by the changing of the compression ratio from said basic compression ratio to said compression ratio suitable for acceleration are added to a basic engine torque that is defined as the engine torque in the state in which the compression ratio is said basic compression ratio.

7. A variable compression ratio internal combustion engine according to claim 4, wherein after acceleration of said internal combustion engine has been started, the compression ratio of the internal combustion engine is set by said compression ratio changing mechanism to said compression ratio suitable for acceleration during a period in which an engine torque associated with acceleration is larger than or equal to said basic engine torque, said engine torque associated with acceleration results when an increase in the engine torque due to an increase in the exhaust gas pressure of said internal combustion engine caused by the changing of the compression ratio from said basic compression ratio to said compression ratio suitable for acceleration and a decrease in the engine torque due to a decrease in heat efficiency of said internal combustion engine caused by the changing of the compression ratio from said basic compression ratio to said compression ratio suitable for acceleration are added to a basic engine torque that is defined as the engine torque in the state in which the compression ratio is said basic compression ratio.

8. A variable compression ratio internal combustion engine according to claim 4, wherein said compression ratio suitable for acceleration is the lowest compression ratio that can be set by said compression ratio changing mechanism.

9. A variable compression ratio internal combustion engine according to claim 8, wherein after acceleration of said internal combustion engine has been started, the compression ratio of the internal combustion engine is set by said compression ratio changing mechanism to said compression ratio suitable for acceleration during a period in which an engine torque associated with acceleration is larger than or equal to said basic engine torque, said engine torque associated with acceleration results when an increase in the engine torque due to an increase in the exhaust gas pressure of said internal combustion engine caused by the changing of the compression ratio from said basic compression ratio to said compression ratio suitable for acceleration and a decrease in the engine torque due to a decrease in heat efficiency of said internal combustion engine caused by the changing of the compression ratio from said basic compression ratio to said compression ratio suitable for acceleration are added to a basic engine torque that is defined as the engine torque in the state in which the compression ratio is said basic compression ratio.

* * * * *